US012759676B2

(12) United States Patent
Bouffier

(10) Patent No.: US 12,759,676 B2
(45) Date of Patent: Oct. 13, 2026

(54) PROCESS FOR MANUFACTURING A RIGID AQUATIC FLOATING OBJECT SUCH AS A SURFBOARD

(71) Applicant: HEXA, Anglet (FR)

(72) Inventor: Léo Bouffier, Anglet (FR)

(73) Assignee: HEXA, Anglet (FR)

( * ) Notice: Subject to any disclaimer, the term of this patent is extended or adjusted under 35 U.S.C. 154(b) by 453 days.

(21) Appl. No.: 18/553,768

(22) PCT Filed: Apr. 4, 2022

(86) PCT No.: PCT/FR2022/050629
§ 371 (c)(1),
(2) Date: Oct. 3, 2023

(87) PCT Pub. No.: WO2022/214760
PCT Pub. Date: Oct. 13, 2022

(65) Prior Publication Data

US 2024/0190538 A1 Jun. 13, 2024

(30) Foreign Application Priority Data

Apr. 8, 2021 (FR) ....................................... 2103611

(51) Int. Cl.
*B63B 32/59* (2020.01)
*B29C 64/188* (2017.01)
(Continued)

(52) U.S. Cl.
CPC ............ *B63B 32/59* (2020.02); *B29C 64/188* (2017.08); *B29C 64/386* (2017.08); *B33Y 10/00* (2014.12);
(Continued)

(58) Field of Classification Search
CPC ......... B63B 32/00; B63B 32/50; B63B 32/60; B63B 32/62; B29C 64/188; B29C 64/386;
(Continued)

(56) References Cited

U.S. PATENT DOCUMENTS

| | | | | |
|---|---|---|---|---|
| 7,845,999 B2 * | 12/2010 | Conner, Jr. | ............... B32B 5/26 441/74 |
| 2004/0005825 A1 * | 1/2004 | Hasted | .................... B63B 32/57 441/65 |
| 2006/0276087 A1 | 12/2006 | Connor, Jr. | |

OTHER PUBLICATIONS

Anonymous, "Wyve and its 3D printed eco-surfboards—3Dnatives", Jan. 15, 2020, https://www.3dnatives.com/en/hexa-surfboard-3d-printed-eco-surfboards-150120204/#!, [retrieved on Dec. 20, 2021], XP055874914.

(Continued)

*Primary Examiner* — Daniel V Venne
(74) *Attorney, Agent, or Firm* — H&I PARTNERS; Chai Im; C. Andrew Im

(57) ABSTRACT

A process for manufacturing a rigid aquatic floating object including an elongate three-dimensional external profile having in total a main length extending from its nose to its tail, a thickness, a width, a deck and an underside. The process includes a) digitally modelling the floating object to be manufactured, b) producing a hollow and apertured internal skeleton by additive manufacturing/3D printing of a multitude of plastic wires that are locally connected to one another geometrically and that reproduce a three-dimensional mesh obtained in a), c) placing the result under vacuum and bonding at least one composite sheet made of fibre and resin around the skeleton forming a shell, d) applying successive fibre-and-resin layers so as to reinforce, via stratification, the shell of step c), and e) finishing the (Continued)

external surface of the stratified sheets made of fibre-and-resin composite by sanding to obtain the final shape of the floating object.

22 Claims, 14 Drawing Sheets

(51) Int. Cl.

| | |
|---|---|
| ***B29C 64/386*** | (2017.01) |
| ***B33Y 10/00*** | (2015.01) |
| ***B33Y 40/20*** | (2020.01) |
| ***B33Y 50/00*** | (2015.01) |
| ***B33Y 80/00*** | (2015.01) |

(52) U.S. Cl.
CPC ............... *B33Y 40/20* (2020.01); *B33Y 50/00* (2014.12); *B33Y 80/00* (2014.12)

(58) Field of Classification Search
CPC ......... B33Y 10/00; B33Y 40/20; B33Y 50/00; B33Y 80/00
USPC ...................................................... 441/65, 74
See application file for complete search history.

(56) References Cited

OTHER PUBLICATIONS

Anonymous, “Blog Post | Wyve | How are made our Surfboards? from the Green & Tech serie”, Jan. 7, 2020, https://www.wyvesurf.com/post/how-are-made-our-surfboards, [retrieved on Dec. 20, 2021], XP055874913.
Hoffmann, Yannik, “Can 3D Printed Surfboards Keep up With Traditional Shaped Surfboards?”, Dec. 31, 2017, https://www.researchgate.net/profile/Yannick-Hoffmann/publication/322807497_CAN_3D_PRINTED_SURFBOARDS_KEEP_UP_WITH_TRADITIONAL_SHAPED_SURFBOARDS/links/5a70e927458515015e63fcad/CAN-3D-PRINTED-SURFBOARDS-KEEP-UP-WITH-TRADITIONAL-SHAPED-SURFBOARDS.pdf, [retrieved on Dec. 20, 2021], DOI: 10.13140/rg.2.2.27720.62721, XP055874883.
Anonymous, “The Yuyo Process”, Feb. 12, 2020, https://yuyo.surf/blogs/le-blog-de-yuyo/the-yuyo-process, [retrieved on Dec. 20, 2021], XP055874984.
Soltani, A., et al., “3D Printing On-Water Sports Boards with Bio-Inspired Core Designs”, Jan. 2020, The Institution of Electrical Engineers, Stevenage, GB, XP002805217 & Polymers MDPI Switzerland, vol. 12, No. 1, Jan. 20, 2020, DOI: 10.3390/POLYM12010250, ISSN: 2073-4360.
International Search Report for application No. PCT/FR2022/050629 dated Jul. 18, 2022.

* cited by examiner

PROCESS FOR MANUFACTURING A RIGID AQUATIC FLOATING OBJECT SUCH AS A SURFBOARD

CROSS REFERENCE TO RELATED APPLICATIONS

This application is a National Stage of International Application No. PCT/FR2022/050629, having an International Filing Date of 4 Apr. 2022, which designated the United States of America, and which International Application was published under PCT Article 21(2) as WO Publication No. 2022/214760 A1, which claims priority from and the benefit of French Patent Application No. 2103611 filed on 8 Apr. 2021, the disclosures of which are incorporated herein by reference in their entireties.

BACKGROUND

Field

The present disclosure relates to a completely innovative process for designing and manufacturing a rigid aquatic floating object, and in particular a process for custom-manufacturing a surfboard.

Brief Description of Related Developments

While surfing is a sporting practice that is becoming professionalized and democratized (appearance at the Olympic Games, construction of artificial wave pools, etc.), surfboards have not evolved over the last sixty years for multiple reasons. Thus, the surfer experiences frictions and obstacles in the practice of his sport which are related to his equipment, both in terms of product and experience.

The increasingly important commitment of high-level athletes to the extreme side of surfing (very big waves, speed of riding, complexity of the figures) on the one hand, and the desire claimed by beginners or surfing enthusiasts to also have high-performance equipment best suited to their practice (surf spot, level) on the other hand, have made users more demanding from the point of view of the technicality of their equipment and the sensations of riding.

In addition, while surfing is extremely demanding, it is very difficult to choose the board adapted to your level and type of wave. A surf shop has between 50 and 300 models of boards in stock. As a result, only 5% of surfboard sellers offer online sales while 30% of transactions are carried out through this channel. Furthermore, the many middlemen often take a significant margin, while increasing the carbon footprint of boards throughout the value chain. This intermediation is an economic and organizational obstacle.

Moreover, almost 80% of the 35 million surfers in the world consider that surfing increases their environmental awareness, surfboards remain a real obstacle to their "green" consumption. In addition, during the process of producing a board, the components travel on average 10000 km before it is delivered to the end customer. However, a conventional surfboard maintains its initial performance for less than a year. It is currently impossible to find eco-responsible boards on the market with the same level of performance as a conventional surfboard.

From a technical point of view, the surf industry has seen very little innovation over the last sixty years due to a production chain paralyzing the players in the sector. Surfing innovations are iterations applied to the conventional foam bar (EPS and Polyurethane), the main component of the surfboard.

Currently, floating objects are conventionally made in the following way:

A polyurethane (PU) foam block reinforced with a central wooden slat or an expanded polystyrene (EPS) block are the main blocks used for the construction of the surfboard. These foams have the advantage of being easy to shape and work by the shaper to get the desired board shape. They are light (40-60 kg/$m^3$ for PU and 10-35 kg/$m^3$ for EPS), inexpensive but extremely toxic to produce (the production of PU block is banned in many countries).

These materials are used as the core of the board, cut by hand by a shaper or by CNC (numerically controlled milling machine) for large scale production. They are then stratified to provide rigidity and impermeability: this is the so-called "sandwich" structure. The core, inserted between two laminates, then works in traction/compression, and no longer simply in bending.

Stratification is the application of composite structure formed by resin and fiber. The most commonly used fiber is glass fiber. Carbon is often used as reinforcement due to its rigidity and alternatives such as linen and hemp are increasingly used instead of glass.

More and more epoxy resins are used for market boards but competition boards remain in polyester due to their more suitable flexibility.

The vast majority of surfboards have housings for inserting the fins. It is simply a plastic housing and a thread to insert a screw holding the fin in place.

Anti-slip coatings are then applied to the surface of the finished board: An anti-slip pad on the back of the board (less often on the entire board), and wax (anti-slip wax) which is applied to the board periodically during use.

However, progress has been made in improving the resistance of floating objects, reducing their weight, and increasing their flexibility. For example, mention can be made of:

- Spine Tek® technology which adds a carbon slat to the deck of the board to replace the wood slat. This makes the board more responsive and maintains its performance better than wood;
- FlexBar® technology which maintains the responsiveness of the board throughout its life. It reduces the vibrations that are often significant in EPS cores and resembles a central wood (or plywood) stringer+an internal sheet in the core in the same material that extends throughout the entire volume of the board;
- XTR Foam® technology which uses a material similar to EPS but hydrophobic therefore does not absorb water;
- Varial Foam® technology which uses lightweight and durable foam that can be used with polyester and epoxy resins;
- Libtech® technology which makes the board more resistant and more environmentally friendly by using more resistant fibers (magnesium and basalt), biosourced resin (epoxy or polyester), encapsulated nitrogen foam or different fibers for resistance (wire mesh on the foam, thick fiber on the rails and on the tail),
- Notox—HardCork Surfboard technology which uses cork for the stratification of the boards, making them more durable and maintaining their performance over time;
- Lost Surfboard® patented Carbon Wrap® technology, which uses a strip of carbon fiber to provide resistance without compromising performance (responsiveness).

To sum up, despite the developments proposed in recent years, few of which have finally penetrated the market, a surfing floating object remains mainly composed of a polyurethane foam board and polyester resin.

The problem is that these boards are extremely toxic (residues are found in the water, particularly in the event of breakage, with the risks that this entails in the pollution of aquatic fauna and flora), fragile, lose their performance over time.

SUMMARY

The present disclosure aims at overcoming these disadvantages with a completely innovative, extremely modular and rapid approach, allowing to manufacture a light, resistant, efficient floating object and adapted to all levels and sizes of practitioners, while being eco-responsible (eco-design, sustainability recycling). For this purpose, the proposed innovation consists in replacing this conventional foam block thanks to the latest technological advances.

To this end, according to a first aspect, the present disclosure relates to a process for manufacturing a rigid aquatic floating object comprising an elongate three-dimensional external profile having in total a main length extending from its nose to its tail, a thickness, a width, a deck and an underside, said process being characterized in that it comprises at least the following steps:

a) digitally modeling the floating object to be manufactured, via a three-dimensional wire mesh of its external profile, b) producing a hollow and apertured internal skeleton by additive manufacturing/3D printing of a multitude of plastic wires that are locally connected to one another geometrically and that reproduce the three-dimensional mesh obtained in step a), c) placing the result under vacuum and bonding at least one composite sheet made of fiber and resin around the skeleton so as to form an external shell of the floating object, d) applying successive fiber-and-resin layers so as to reinforce, via stratification, the shell obtained in step c), and e) finishing the external surface of the stratified sheet made of fiber-and-resin composite by sanding to obtain the final shape of the floating object.

The disclosure is implemented according to the aspects and variants set out below, which are to be considered individually or in any technically effective combination.

Advantageously, step a) includes two primary sub-steps of individualized digital modeling of the floating object based on the collection of user parameters wherein:

a1) the user answers a questionnaire relating to his personal physiological data such as his weight and height, floating object use data such as his level, his physical fitness and his usual surfing conditions, and external data of the floating object such as its length, width, thickness and general proportions, and a2) use of a first personalization algorithm which will select, from a database of determined boards, the model most suited to the surfer according to the parameters previously entered in the primary sub-step a1) in order to carry out the graphic modeling of the mesh corresponding to this selected model Preferably, step a) further includes a secondary sub-step a3) of adaptation of the graphic modeling of the model selected in the primary sub-step a2) to modify if necessary its total/local density and/or the thicknesses of the mesh lines according to the parameters that the user has previously entered in the primary sub-step a1).

More precisely, step a) includes a tertiary sub-step a4) of cutting the mesh into a multitude of parallel slices preparing for 3D printing, said slices then being produced by superposition during the 3D printing step b).

According to a preferred aspect of the present disclosure, step c) consists of a first sub-step c1) of preparing a first sheet of composite resin constituting the underside of the floating object, a second sub-step c2) of preparing a second sheet of composite resin constituting the deck of the floating object, and a third sub-step c3) of joining the two sheets around the skeleton and simultaneously bonding said sheets in a vacuum bag.

Advantageously, during sub-step c1), the sheet is previously produced on a flat work bench then cut at the median external profile of the skeleton before being bonded.

Preferably, during sub-step c2), the sheet is previously produced on the skeleton in order to produce a preform of said board, then it is bonded on the skeleton after crosslinking the resin.

According to a particular aspect, at least one of the sheets is produced by molding.

According to a particular aspect of the present disclosure, the step b) consists of a first sub-step b1) of manufacturing at least two distinct portions of the skeleton and a second sub-step b2) of joining these portions by bonding.

Advantageously, the portions are bonded on either side of an intermediate internal transverse rail.

According to an alternative aspect, step b) consists of manufacturing the entire internal skeleton of the floating object integrally.

According to a particularly interesting aspect of the present disclosure, step b) consists of producing a skeleton including on the one hand a median peripheral belt and on the other hand a central cellular structure comprising a plurality of polygonal geometric patterns each consisting of wires, the flat angle between two consecutive wires of the same pattern being substantially equal to 60°.

Preferably, the central cellular structure includes, respectively at the deck and the underside, a repetition of patterns in the general shape of a hexagon each reinforced by wires connecting certain vertices to the center of said hexagon.

According to another alternative aspect of the present disclosure, the central cellular structure includes, respectively at the deck and the underside, a repetition of patterns in the general shape of a triangle.

According to a complementary aspect, during step b) the cellular structures constituting the deck and the underside are connected to each other by walls extending substantially perpendicular to the latter, depending on the thickness of the skeleton. These walls can be entirely solid or apertured.

According to an advantageous feature, the stratification material used in step c) is transparent or translucent.

More precisely, the stratification material used in step c) is a composite made of glass, linen, hemp or carbon fibers mixed with an epoxy or polyester resin.

According to a particular aspect of the present disclosure, the material used in step b) is selected from the set consisting of recycled polyethylene terephthalate, biosourced poly lactic acid, polyethylene terephthalate reinforced with fibers among carbon, kevlar, glass or vegetable fibers, or a combination thereof, expanded poly lactic acid, expanded polyethylene terephthalate or polyamide.

Advantageously, the volume of material used in step b) to produce the skeleton is comprised between approximately 1% and 10% of the total volume of the interior of the floating object, and preferably between approximately 2 and 6%.

Preferably, the floating object is a surfboard.

The present disclosure also relates to a rigid aquatic floating object, such as a surfboard, comprising an elongate three-dimensional external profile having in total a main length extending from its nose to its tail, a thickness, a width, a deck and an underside, said floating object being manufactured using the process as described above.

BRIEF DESCRIPTION OF THE FIGURES

Other advantages, aims and features of the present disclosure emerge from the following description given, for an explicative and non-limiting purpose, with reference to the appended drawings, wherein.

DETAILED DESCRIPTION

Figure 1:
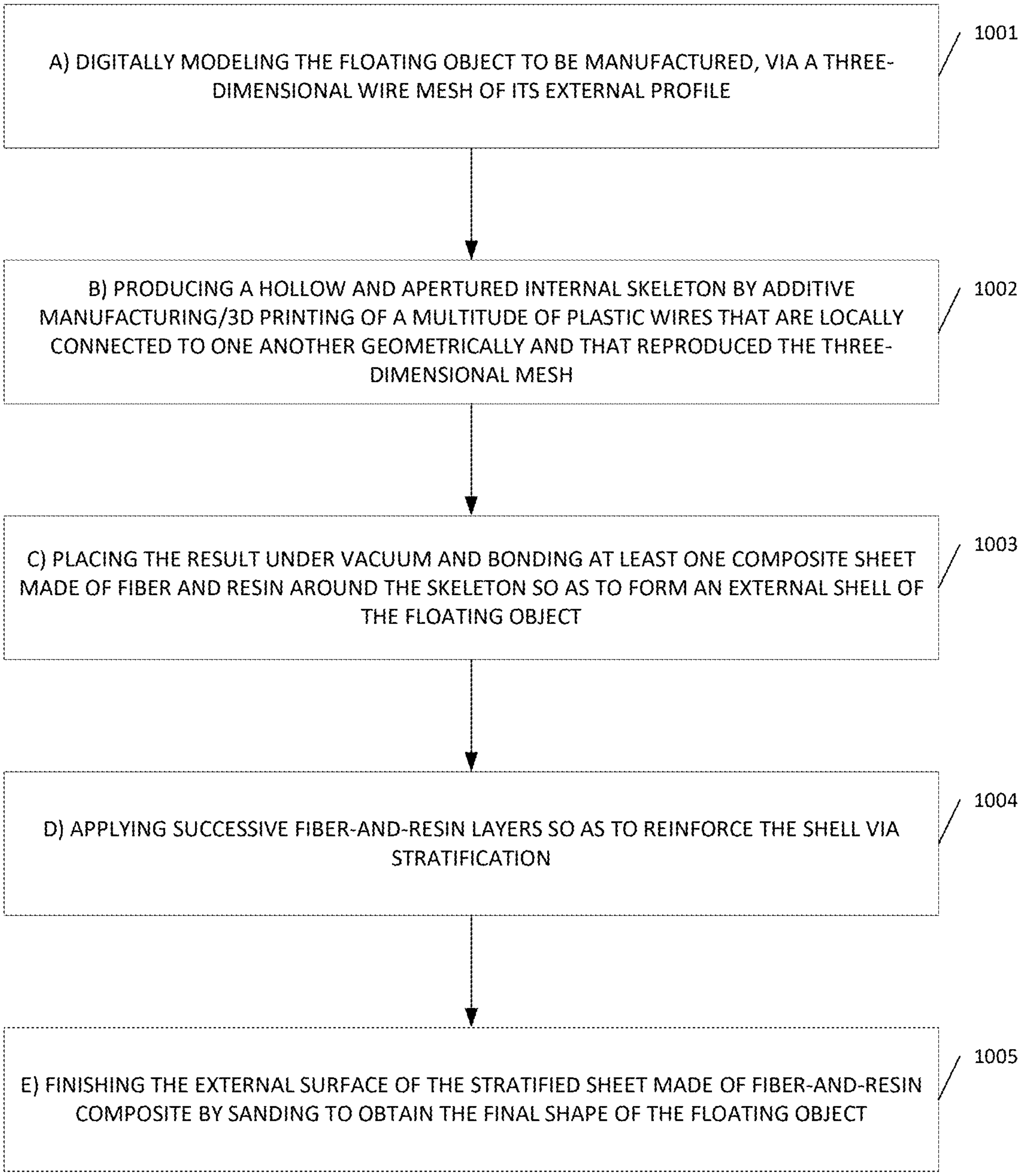
FIG. 1 is a simplified diagram describing the process for manufacturing a surfboard in accordance with the present disclosure.
Figure 2:
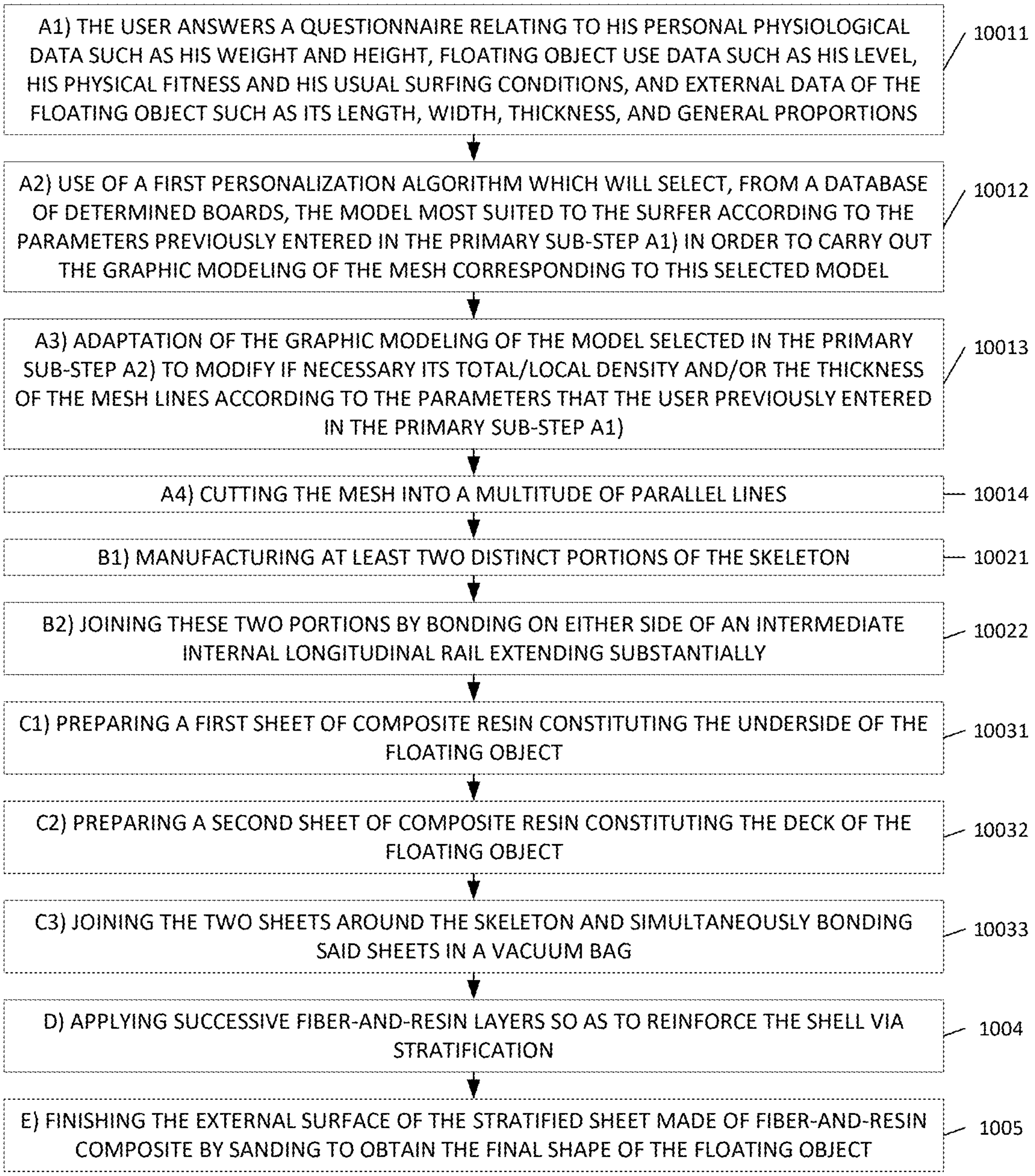
FIG. 2 is a more detailed diagram of the process of FIG. 1.

FIGS. 1 and 2 are diagrams describing generally and in more detail the different steps of manufacturing a surfboard 10 in accordance with the present disclosure.

Thus, the process comprises the following steps:

a) digitally modeling the floating object to be manufactured, via a three-dimensional wire mesh of its external profile (FIG. 1, Block 1001), b) producing a hollow and apertured internal skeleton by additive manufacturing/3D printing of a multitude of plastic wires that are locally connected to one another geometrically and that reproduce the three-dimensional mesh (FIG. 1, Block 1002), c) placing the result under vacuum and bonding at least one composite sheet made of fiber and resin around the skeleton so as to form an external shell of the floating object (FIG. 1, Block 1003), d) applying successive fiber-and-resin layers so as to reinforce the shell via stratification (FIG. 1, Block 1004), and e) finishing the external surface of the stratified sheet made of fiber-and-resin composite by sanding to obtain the final shape of the floating object (FIG. 1, Block 1005).

More precisely, initially (primary sub-step a1) the user answers a questionnaire (for example using an interface such as a specific program/an application on a computer/tablet/smartphone remotely or on site) relating to their personal physiological data, such as their weight and height, floating object usage data, such as the level, the physical fitness and the usual surfing conditions, and external data of the desired floating object, such as its length, width, thickness and general proportions (FIG. 2, Block 10011).

This allows to know a little more about the user in order to best personalize their board based on both easily quantifiable objective criteria (weight, size of the user; shape and dimensions of the floating object) but also more criteria which are subjective and sufficiently explicit and determinable which are for example related in particular to "riding", such as sensations, the way of surfing (soft, sporty, aggressive), etc. Of course, the user will be guided in this approach with for example a limited choice of answers for the subjective part.

Secondly (primary sub-step step a2), the process uses a first personalization algorithm which will select, from a database of determined boards, the basic model most suited to the surfer according to the parameters previously entered in the primary sub-step a1 in order to carry out the graphic modeling of the mesh corresponding to this selected model (FIG. 2, Block 10012).

This involves extracting from an existing database the basic board model which is closest to the criteria entered relating to the user (objective physiological data and more subjective data related to riding) and the board (dimensional features). It is a sort of pre-selection from a list of several hundred to several thousand possible combinations.

In a third step (primary sub-step a3), the process adapts the graphic modeling of the "basic" model selected in the primary sub-step a2 to modify, if necessary, its total/local density and/or the thicknesses of the lines of the mesh according to the parameters that the user has previously entered in the primary sub-step a1. This allows to obtain a completely personalized surfboard (FIG. 2, Block 10013). A definitive mesh is therefore obtained, this mesh extending from nose 11 to tail 12.

In a fourth primary sub-step a4, the process cuts the mesh into a multitude of parallel slices in order to prepare for additive manufacturing (FIG. 2, Block 10014).

Step b then consists of the actual manufacturing of a hollow skeleton 15 by additive manufacturing/3D printing using a plastic material printer of known type and the modeling carried out previously.

For this purpose, the material used in step b is selected from the set consisting of recycled polyethylene terephthalate, biosourced poly lactic acid, fiber-reinforced polyethylene terephthalate from carbon, kevlar, glass or plant fibers, or a combination thereof, expanded poly lactic acid, expanded polyethylene terephthalate or polyamide.

Figure 3:
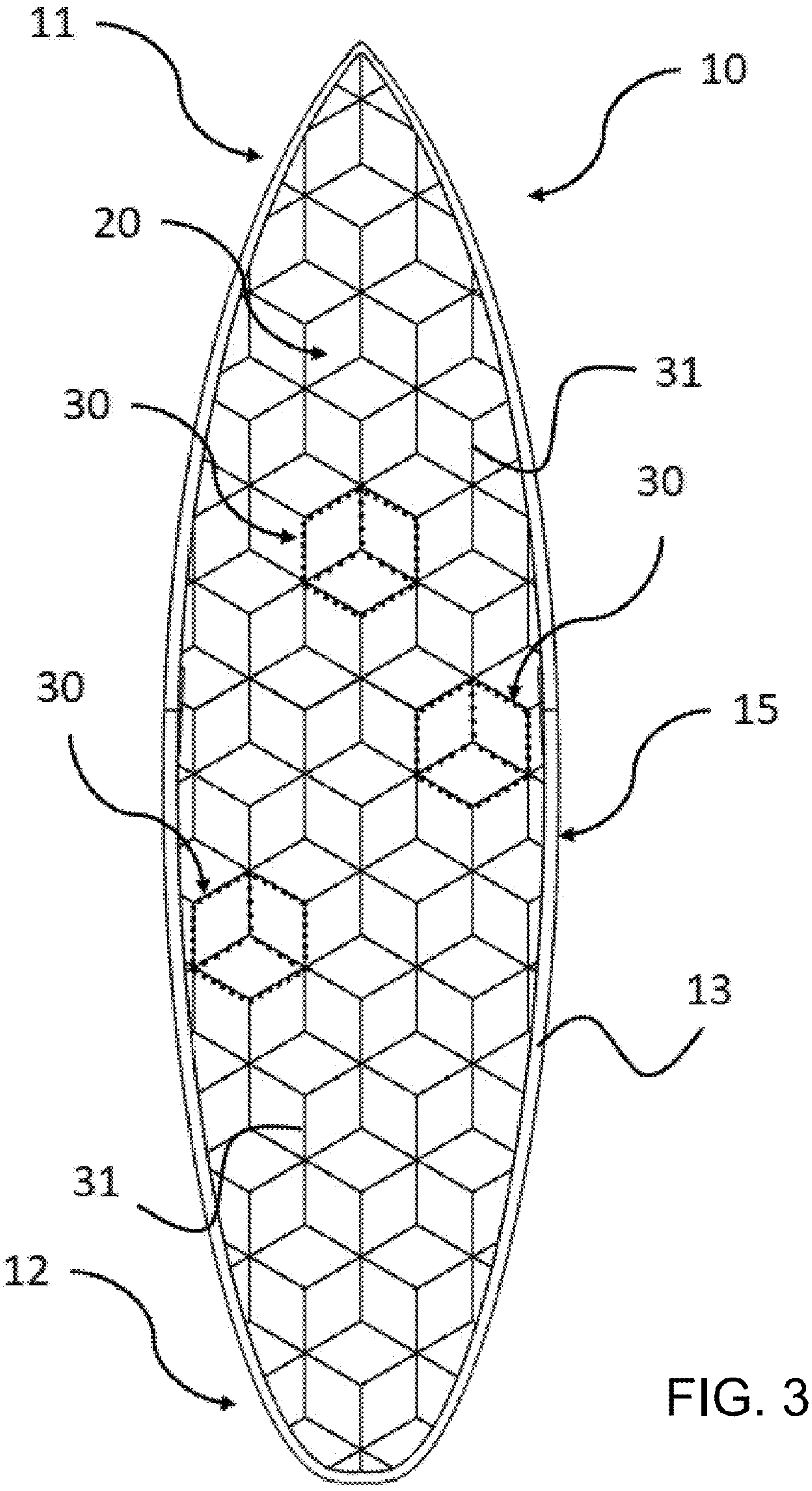
FIG. 3 is a top view of a surfboard produced using the process in accordance with the present disclosure.

3D printing consists more precisely of producing a skeleton 15 including on the one hand a median peripheral belt 13 (approximately at mid-height of the floating object once finished) and on the other hand a hollow central cellular structure 20 comprising a plurality of polygonal geometric patterns 30 each consisting of wires 31 of molten then solidified material, the flat angle (FIG. 3) between two consecutive wires 31 of the same base pattern being substantially equal to 60°.

Figure 4:
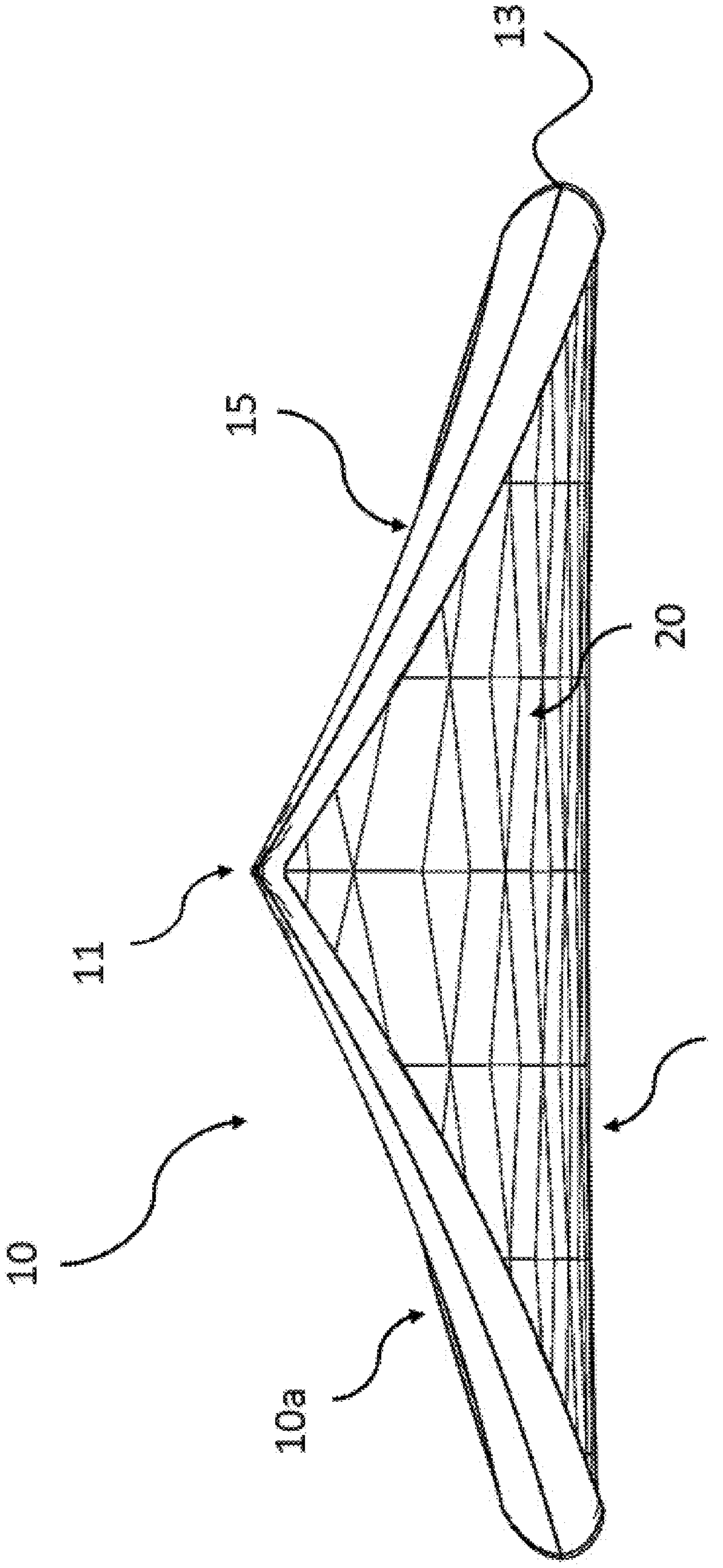
FIG. 4 is a front view of FIG. 3.
Figure 5:
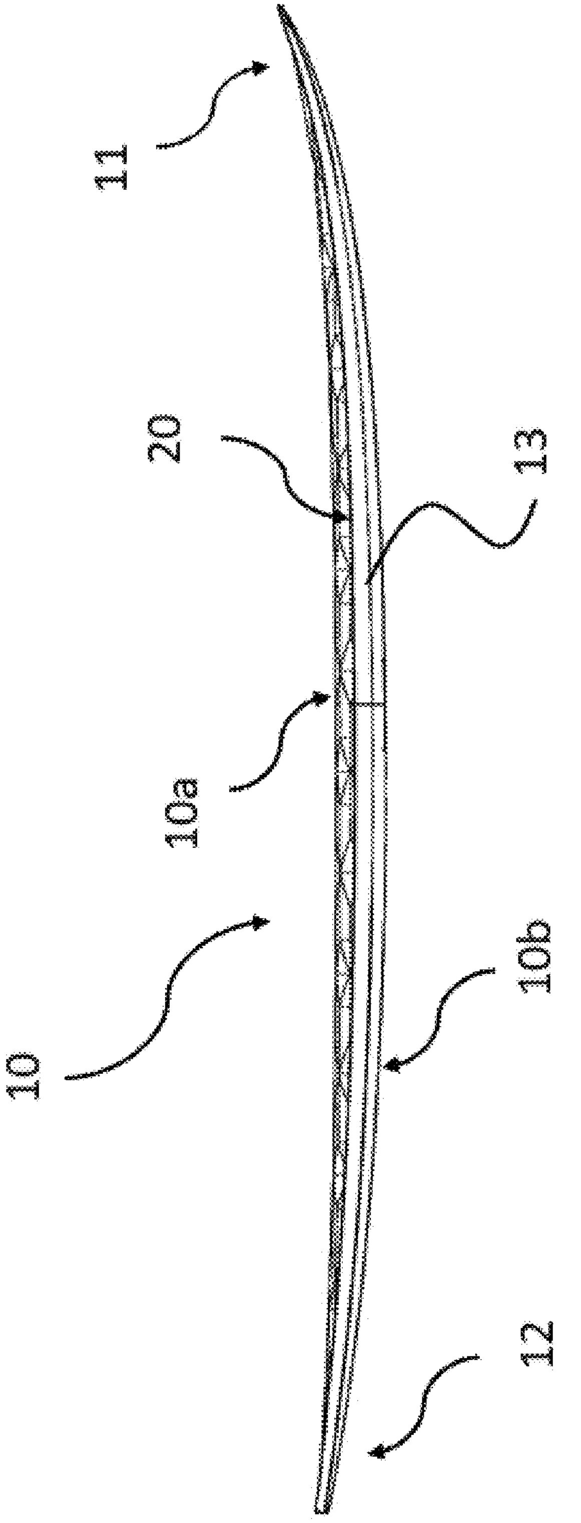
FIG. 5 is a side view of FIG. 3
Figure 6:
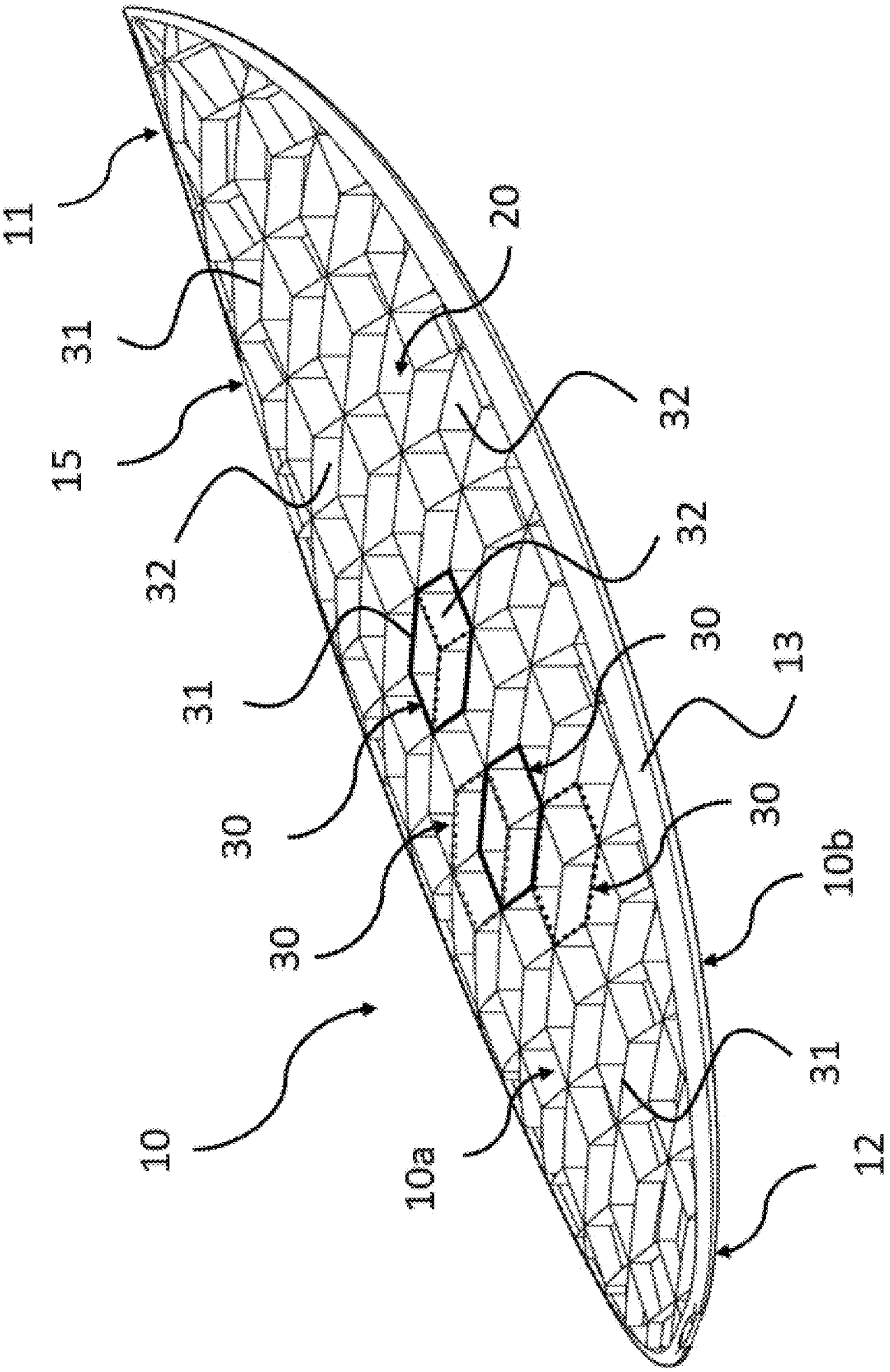
FIG. 6 is a perspective view of the surfboard of FIGS. 3 to 5.
Figure 7:
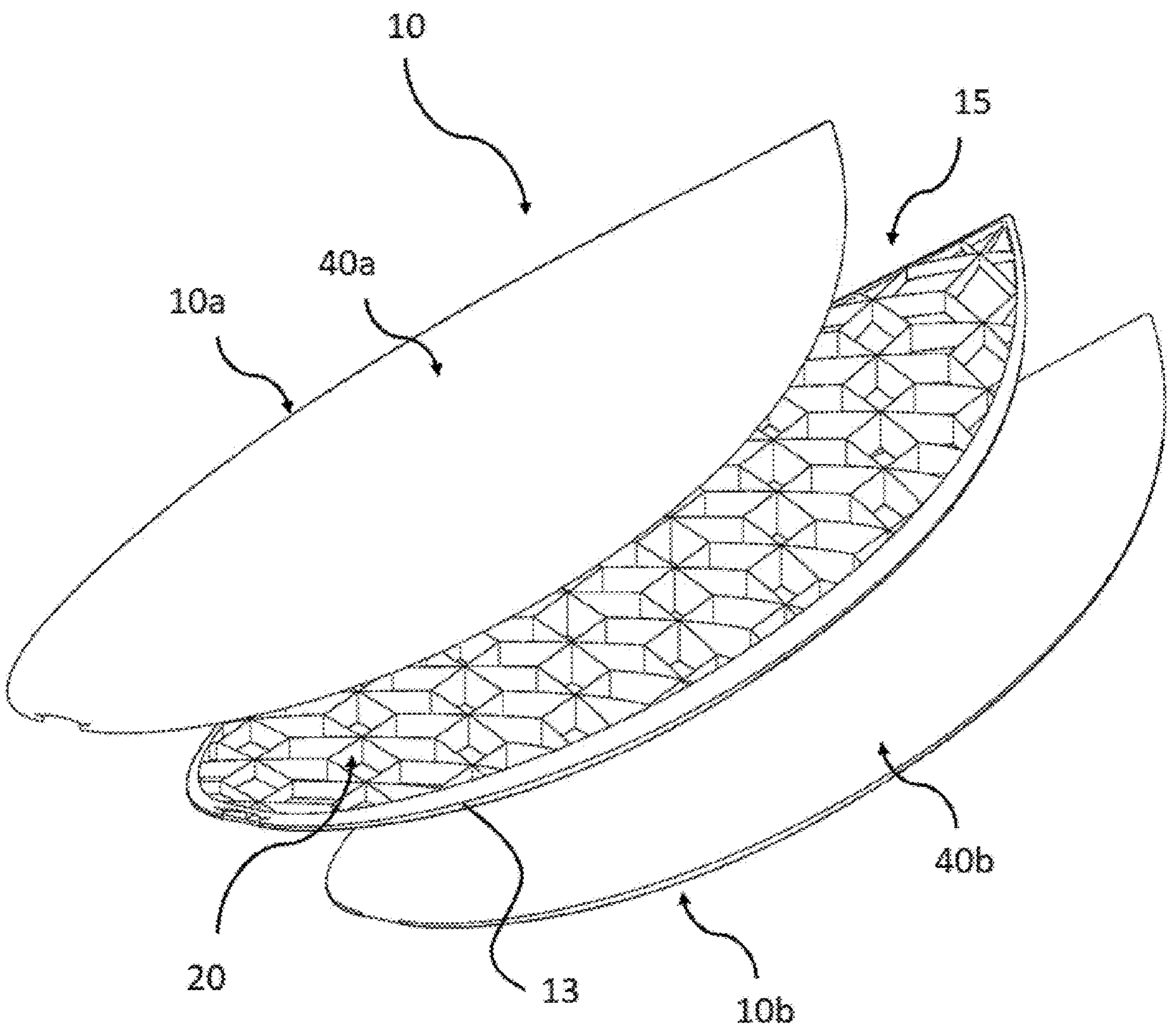
FIG. 7 is an exploded perspective view of a particular step of manufacturing the surfboard using the process in accordance with the present disclosure.
Figure 8:
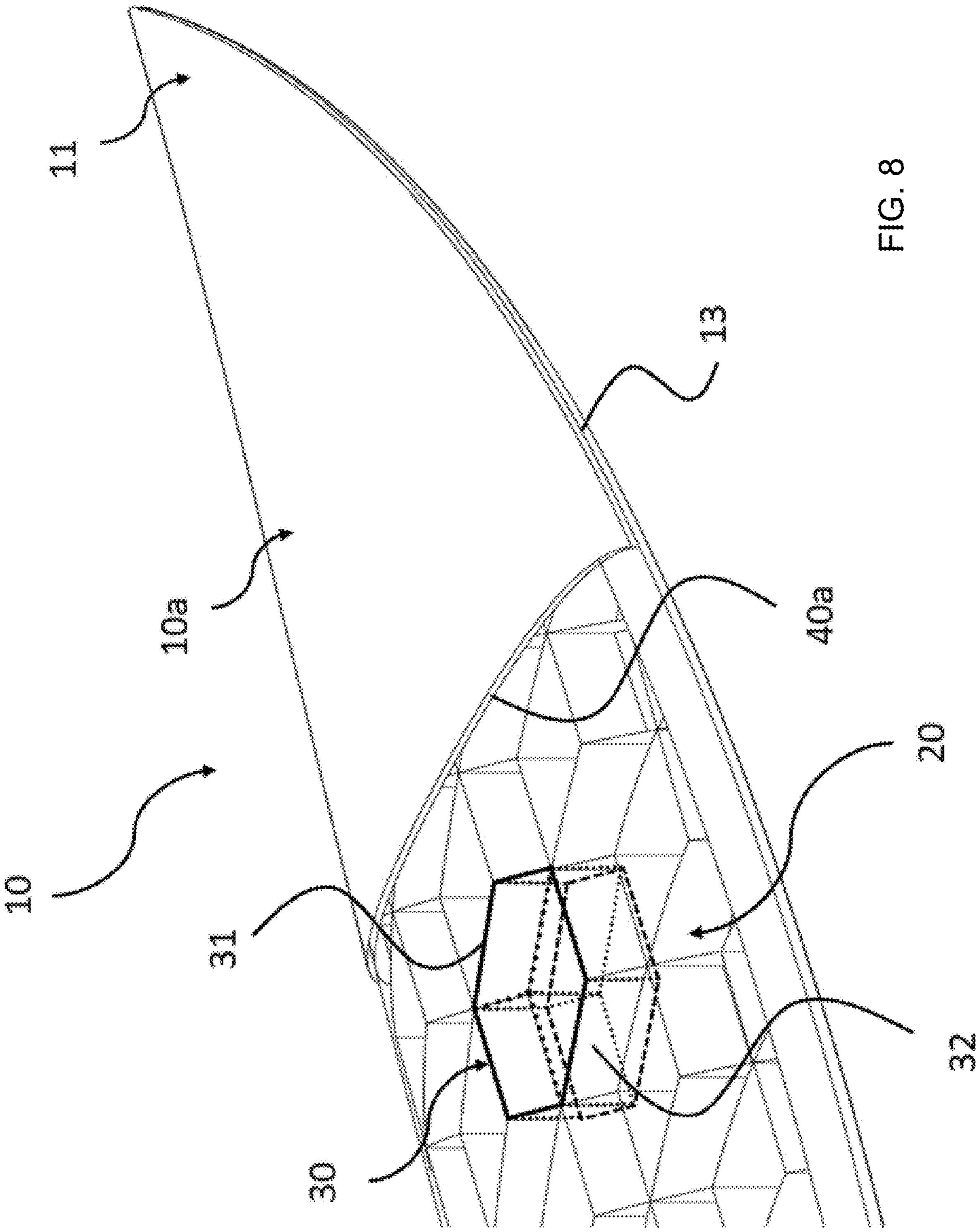
FIG. 8 is a detailed view of a first type of mesh used to produce the surfboard.

As visible in FIGS. 3 to 8, the central cellular structure 20 of the skeleton 15 includes, respectively at the deck 10*a* and the underside 10*b*, a repetition of patterns 30 in the general shape of a hexagon, the external wires 31 of which describing its periphery are reinforced by internal wires 31 connecting certain vertices to the center of said hexagon. It should be noted that each pattern 30 is not perfectly planar due to the curved three-dimensional shape of the skeleton 15 (laterally as illustrated in FIG. 4 and from the nose 11 to the tail 12 as illustrated in FIG. 5).

Moreover, the cellular structures 30 constituting the deck 10*a* and the underside 10*b* are connected to each other by solid walls 32 extending substantially perpendicular to the latter, according to the thickness of the skeleton 15.

This step of the process thus allows to obtain a sufficiently rigid but very light skeleton 15 defining the geometric contours of the final floating object 10.

Step c consists of a first sub-step c1 of preparing a first sheet of composite resin 40*b* constituting the underside 10*b* of the floating object (FIG. 2, Block 10031), a second sub-step c2 of preparing a second sheet of composite resin 40*a* constituting the deck 10*a* of the floating object 10 (FIG. 2, Block 10032), and a third sub-step c3 of joining the two sheets 40*a* and 40*b* around the skeleton 20 and simultaneously bonding said sheets in a vacuum bag (FIG. 2, Block 10033).

In the present case, the temperature during the vacuuming step is of the order of 20 to 27 degrees Celsius, the duration of the vacuuming is approximately 5 hours to 6 hours of vacuuming, and the pressure comprised between substantially −0.15 to −0.3 bar. The bonding is carried out for example using an epoxy resin or the like.

More precisely, during sub-step c1, the sheet 40*b* of the underside is previously produced on a flat work bench then cut at the median external profile of the skeleton 15 (in the middle of its thickness) before being bonded.

Likewise, during sub-step c2, the sheet 40*a* of the deck is previously made on the skeleton 15 in order to produce a preform of said board, then it is bonded to the skeleton 20 after crosslinking the resin.

More specifically, this sheet 40*a*, which is in fact more of a preform, is produced by placing on the deck of the board a sort of thin (approximately 1.5 mm) thermoplastic elastomer mat which serves to produce the equivalent shape of the deck but without the cells 30 of the skeleton 15. Then this allows to produce the sheet 40*a* (or rather preform) on this mat without it falling into the cells 30. This thermoplastic mat must have a certain hardness to obtain satisfactory results, for example close to 50 Shore A.

Alternatively, at least one of the sheets 40*a*, 40*b* is produced separately by molding, for example using the external profile of the skeleton 15 defined during the meshing step.

According to an important feature of the present disclosure, the stratification material used in step c is transparent or translucent, so that the patterns 30 of the skeleton 20 are visible. For this purpose, the stratification material used in the step c of placing under vacuum is a composite made of glass, linen, hemp or carbon fibers mixed with an epoxy or polyester resin. Preferably, both the sheet 40*b* used to form the underside 10*b* and that 40*a* used to make the deck 10*a* are transparent so that it is possible to see completely through the floating object 10, which gives a very original and spectacular appearance to the product. It is obviously also possible to see the seabed through the floating object 10 when the user is surfing.

Step d consists of applying, according to a known standard method, successive fiber-and-resin layers so as to reinforce, via stratification, the shell defined by the two bonded sheets 40*a* and 40*b*.

Finally, the last step e consists in finishing the external surface of the stratified shell made of fiber-and-resin composite by sanding to obtain the final shape of the floating object 10.

Once the floating object 10 is completed, the volume of material used in step b to produce the skeleton 15 is comprised between approximately 1% and 10% of the total volume of the interior of the floating object 10, and preferably between approximately 2 and 6%.

Figure 9:
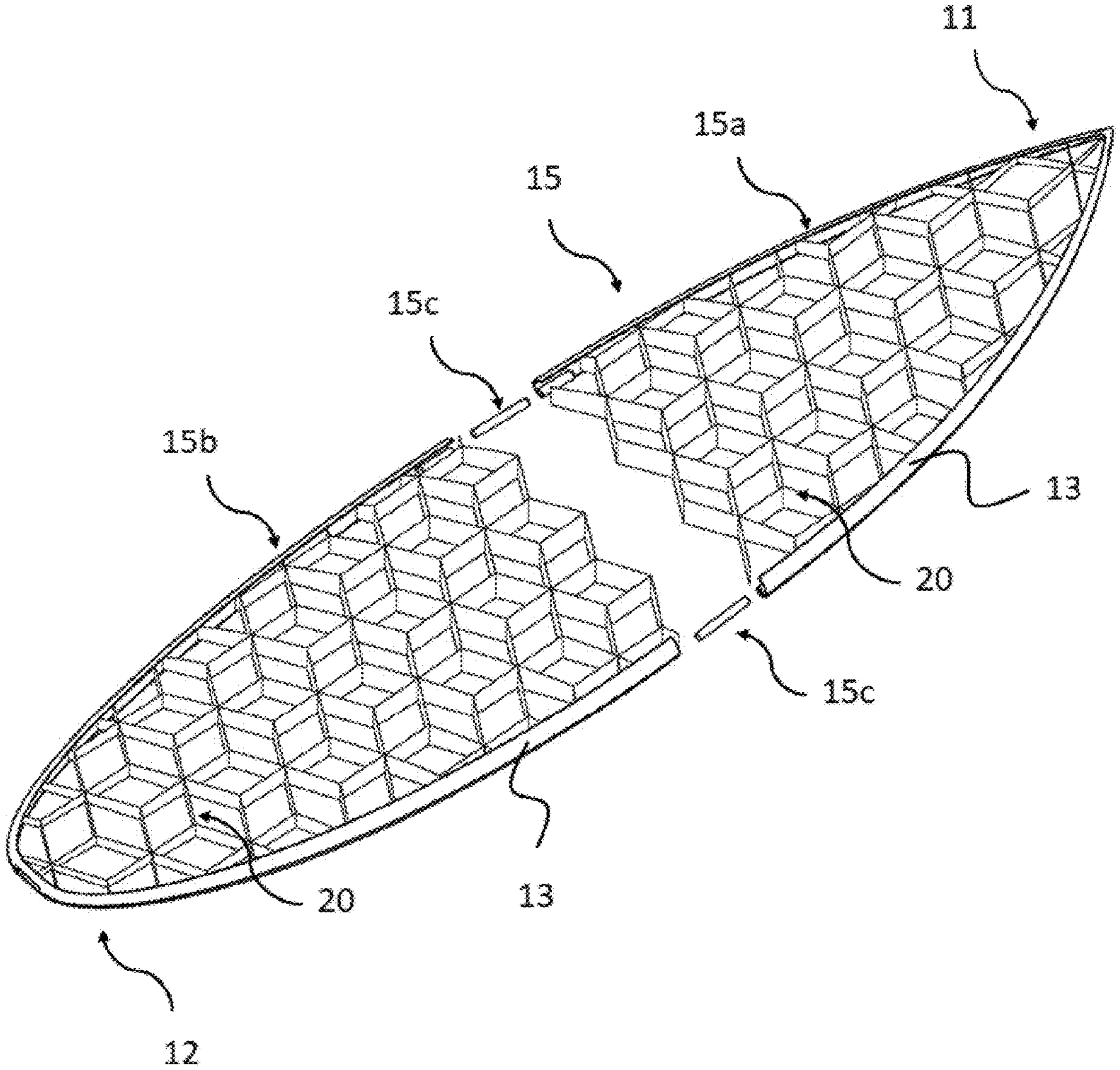
FIG. 9 is an exploded perspective view of an alternative aspect of the surfboard of FIGS. 3 to 8.
Figure 10:
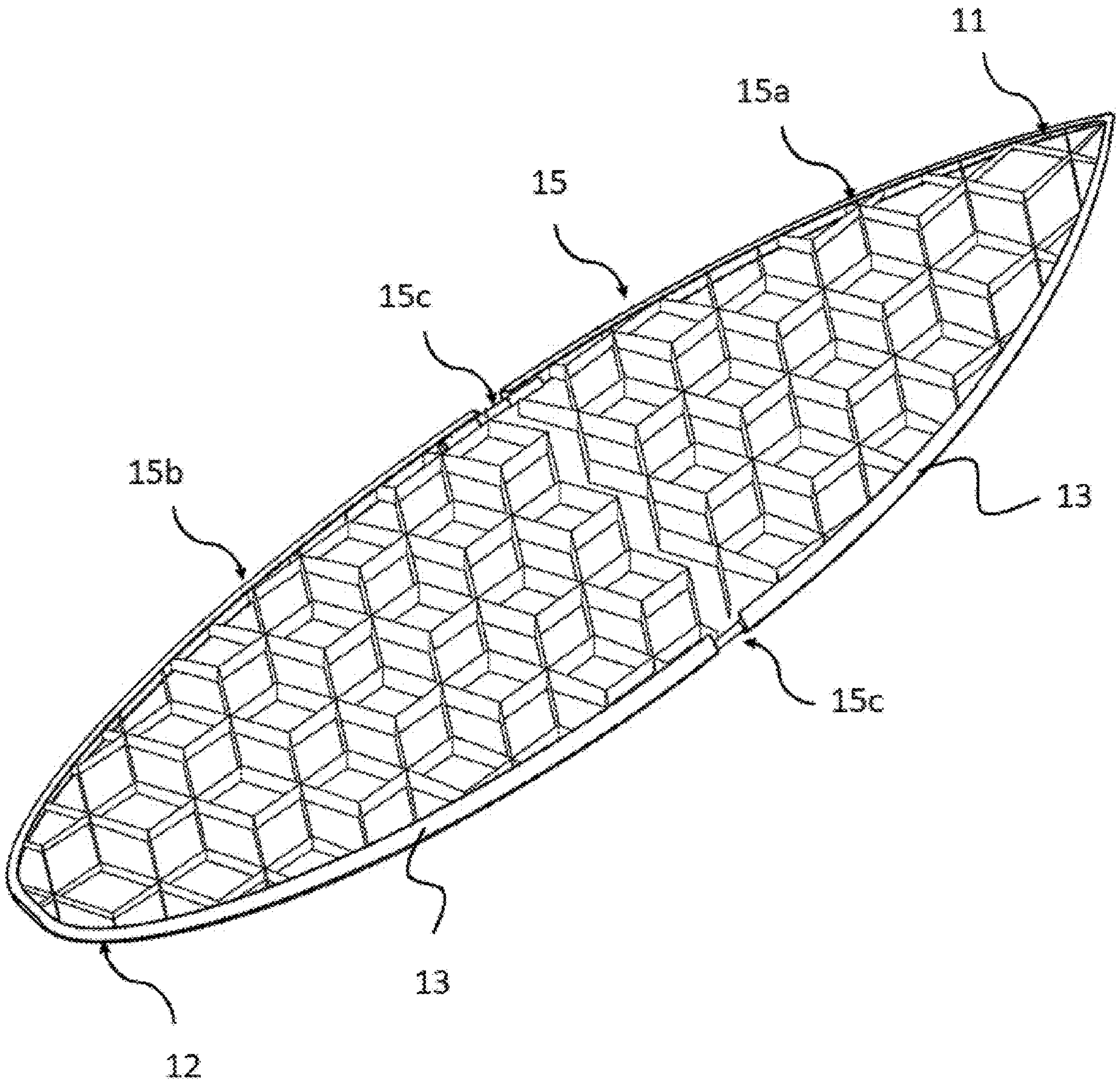
FIG. 10 is a perspective view of the assembled board of FIG. 9.
Figure 11:
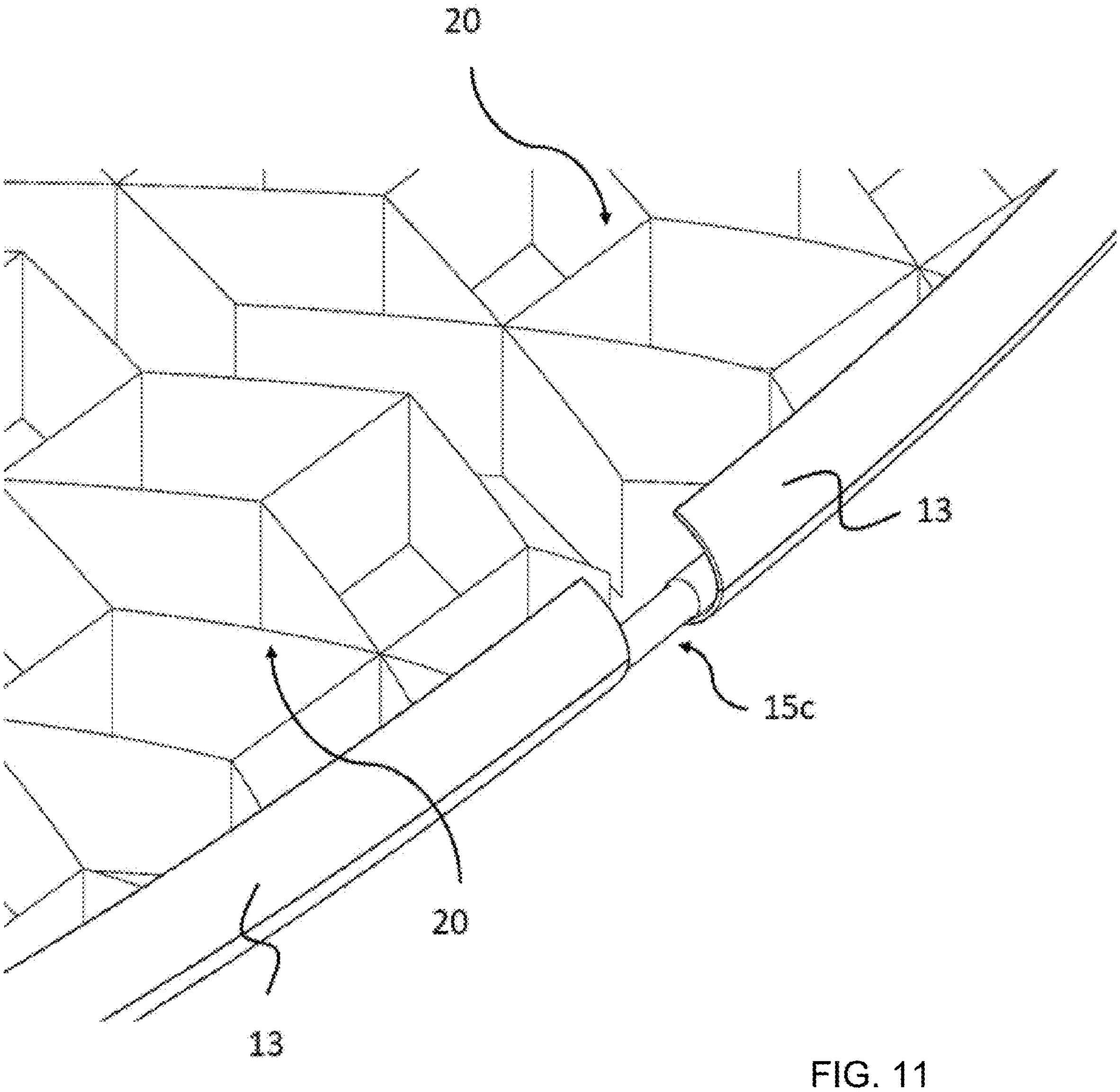
FIG. 11 is a detailed perspective view of FIG. 10.

According to a variant illustrated by FIGS. 9 to 10, step b is divided into a sub-step b1 of manufacturing two distinct portions 15*a* and 15*b* of the skeleton 15 (FIG. 2, Block 10021) then a sub-step b2 of joining these two portions 15*a* and 15*b* using intermediate internal side rails 15*cc*, a rail portion integrated into each portion 15*a* and 15*b* and a third central connecting rail (FIG. 2, Block 10022). As shown in the detailed view of FIG. 11, the two longitudinal portions 15*a* and 15*b* fit together thanks to the side rails 15*c* and the central shapes of the two portions 15*a* and 15*b* (FIGS. 9 then 10 then 11) complement each other so as to form a skeleton 15 which appears to be made integrally before being covered by the outer sheets 40*a* and 40*b* in order to form the deck 10*a* and the underside 10*b* in the same manner as described previously. These rails are for example made of carbon fiber-epoxy tubes of 5 to 10 mm in diameter and measure between approximately 10-30 cm in length.

Figure 12:
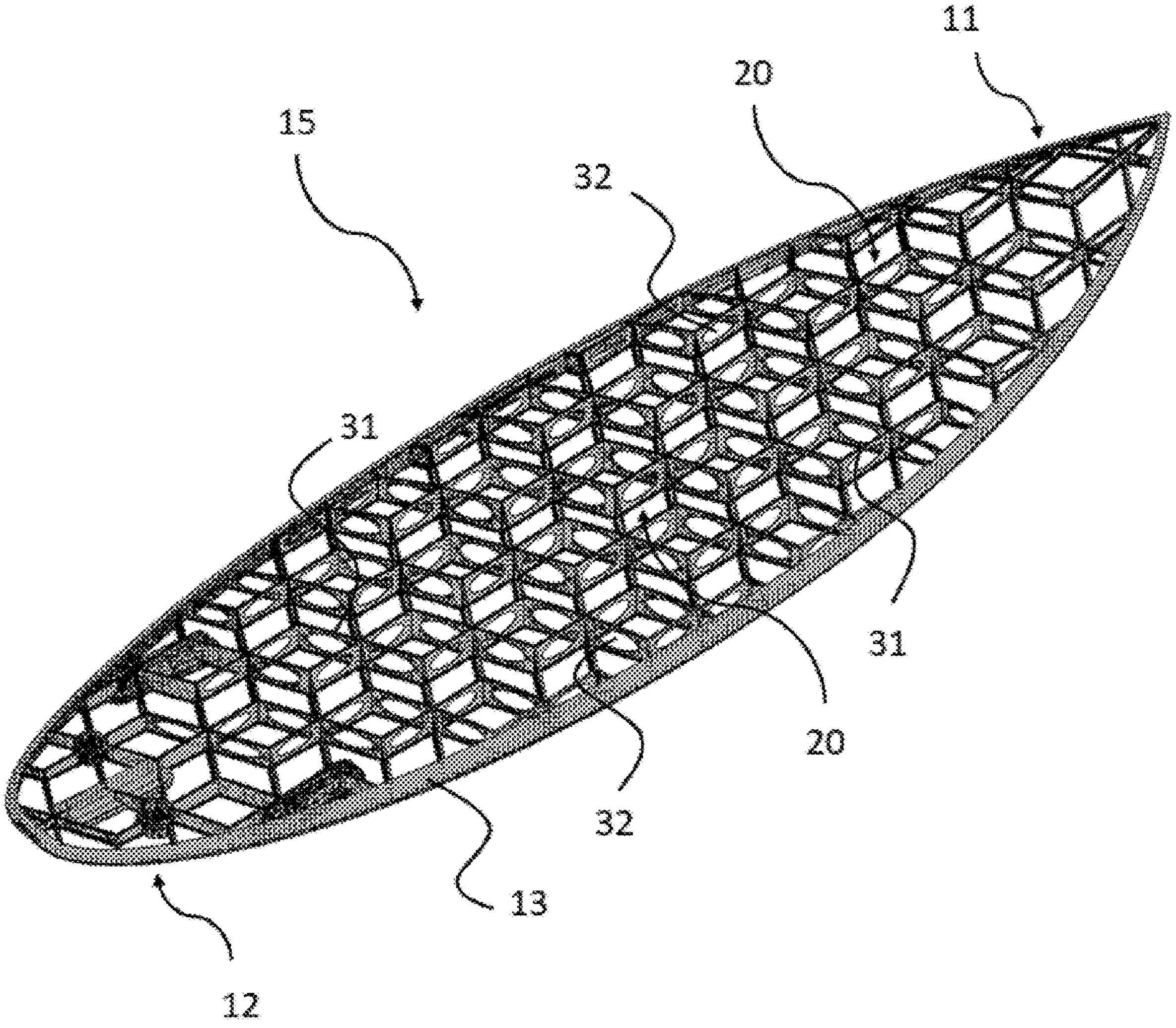
FIG. 12 is a perspective view of an alternative aspect of FIGS. 3 to 11.
Figure 13:
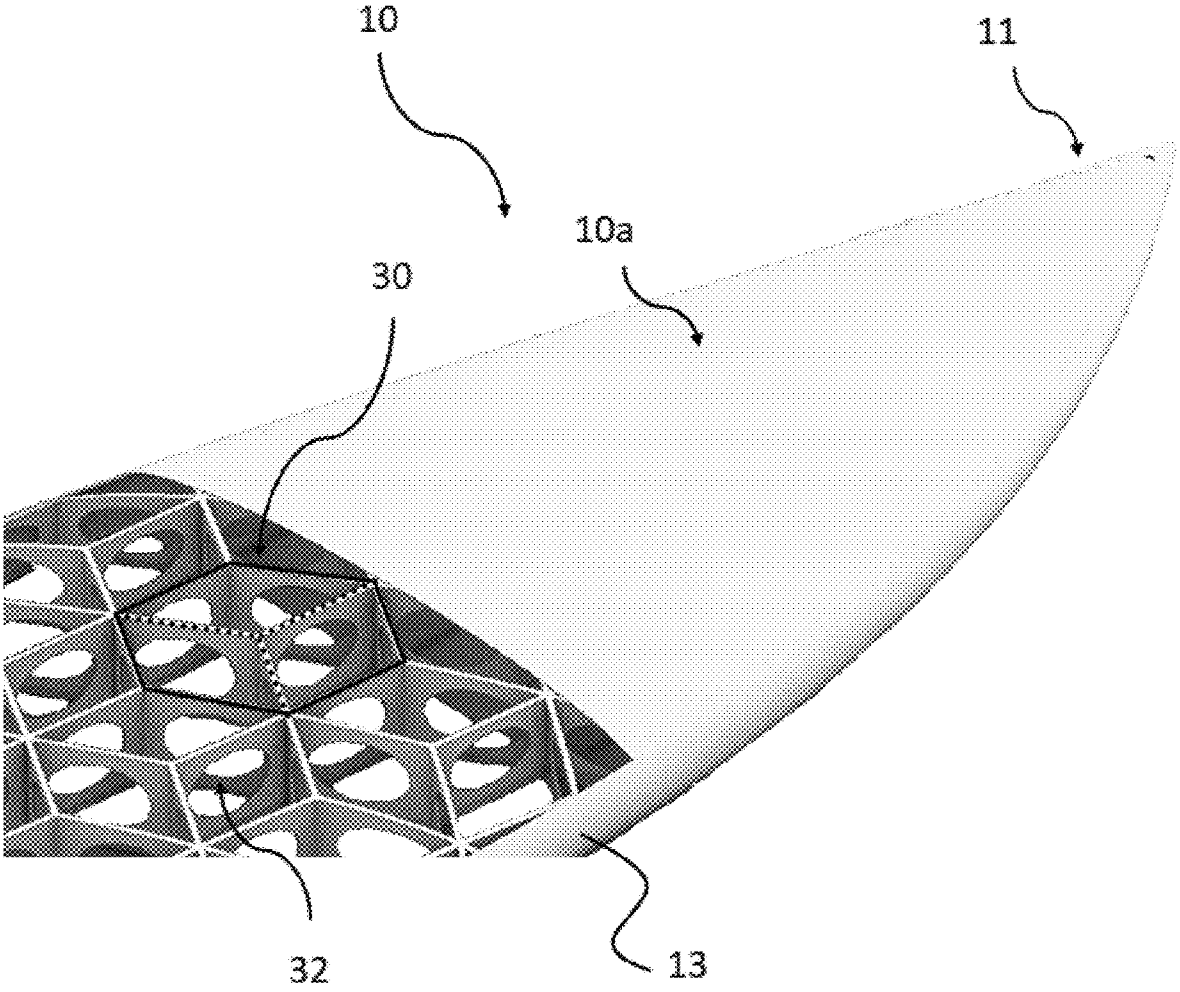
FIG. 13 is a detailed view of FIG. 12 illustrating another type of mesh.

FIGS. 12 and 13 represent an alternative aspect wherein the walls 32 of the cellular structure 20 are apertured so as to further lighten the skeleton 15. This configuration can be chosen during step a according to the choices of the user, on the one hand, and/or the base material used during the additive manufacturing of the skeleton 15, on the other hand, certain materials being more resistant than others at the same thickness of material.

Figure 14:
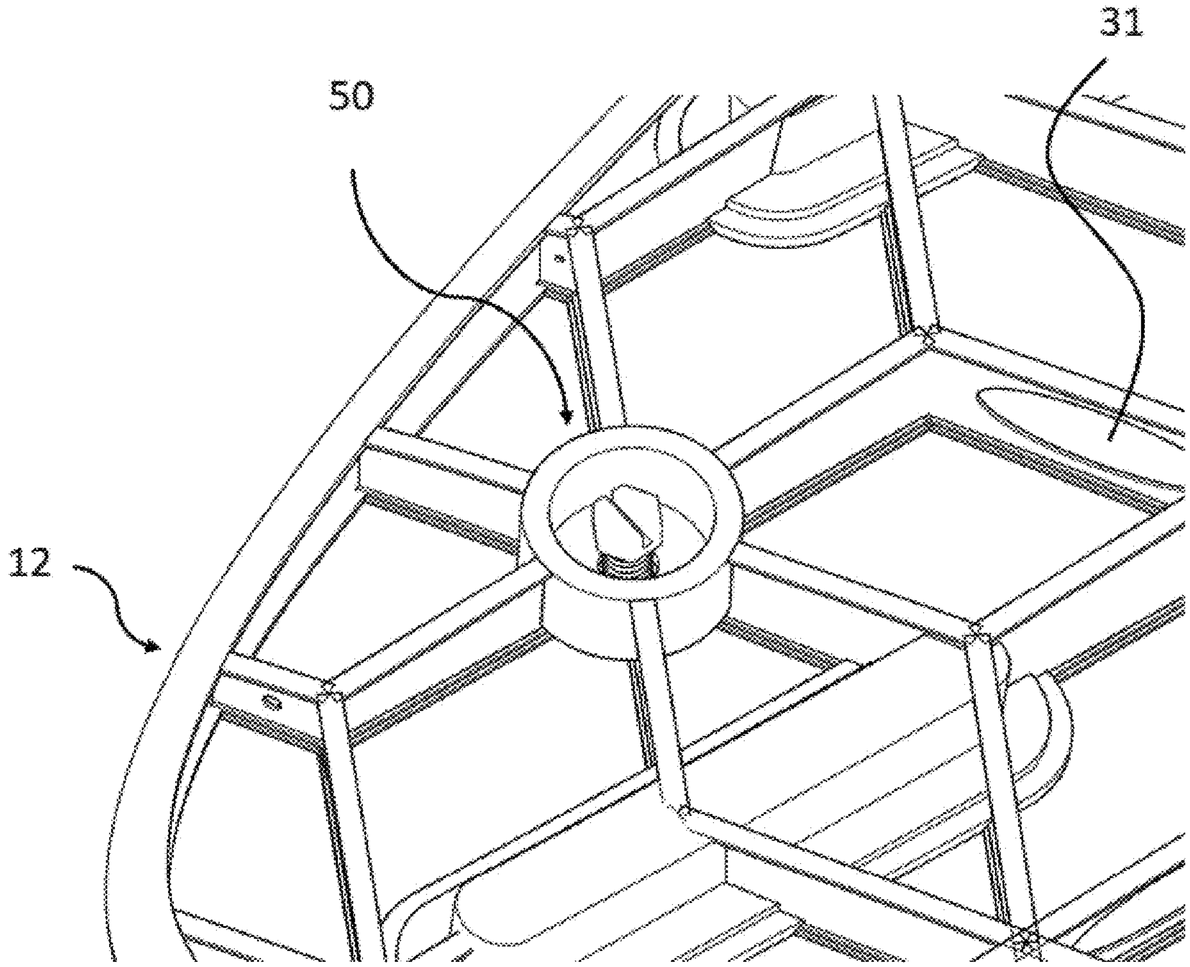
FIG. 14 is a detailed view illustrating a rear valve equipping the surfboard.

In the two aspects proposed above, an insert 50 including a screw with a breathable membrane (Gore Tex® type) is also added to be able to balance the internal pressure of the board with the external pressure (the total volume of the floating object is mainly consisting of air), this is to prevent the air from remaining trapped inside the shell and expanding/retracting when temperature or pressure changes, which would damage the board. FIG. 14 illustrates such a valve and its location at the rear of the board.

The process thus described allows to obtain a more durable board:

- thanks to its plastic cellular structure, more resistant to impact than foam,
- thanks to the absence of polyurethane or EPS foams which would absorb water and degrade in the event of infiltration; the boards thus obtained can simply be drained,
- thanks to the recyclability of the skeleton components.

The process also allows to obtain a more efficient board:

- thanks to the use of a multitude of materials adapting to the needs of the surfer,
- thanks to the non-homogeneity of the material, the mesh can be modified to move the center of flotation and gravity: a center of gravity that is lower than that of flotation generates a stable board (sought in longboarding), a center of gravity that is higher than that of flotation results in a less stable board, therefore more responsive (sought in performance surfing).

Finally, the process allows to obtain an aesthetic board:

thanks to transparency and freedom of design, and thanks to the absence of foam which prevents yellowing.

It should be clearly understood that the detailed description of the object of the disclosure, given only by way of illustration, does not in any way constitute a limitation, technical equivalents also being comprised within the scope of the present disclosure.

Thus, the process can absolutely be used for other types of aquatic floating objects such as paddle boards, windsurf, windfoil, kitesurf, kitefoil, supfoil, surf foil, wakeboard, wakefoil boards, sailboat floating objects such as catamarans or trimarans, or other types of shells for nautical use.

The type of mesh used may also be different from a geometric point of view in the examples given in the description for illustration purposes only since the printed patterns, whether repetitive or not, identical or not (in their entirety), allow to meet user requirements, manufacturing constraints and conditions of use (in particular rigidity).

Thus, the central cellular structure 2 can include, respectively at the deck and the underside, a repetition of patterns in the general shape of a triangle.

Areas of mechanical reinforcement can be provided, as well as localized opaque areas.

Of course, areas are provided for inserting fins and attaching a leash.

What is claimed is:

1. A process for manufacturing a rigid aquatic floating object including an elongate three-dimensional external profile having in total a main length extending from nose to tail, a thickness, a width, a deck and an underside, said process comprising at least the following steps:

a) digitally modeling the rigid aquatic floating object to be manufactured, via a three-dimensional wire mesh of an external profile of the rigid aquatic floating object, b) producing a hollow and apertured internal skeleton by additive manufacturing or 3D printing of a multitude of plastic wires that are locally connected to one another geometrically and that reproduce the three-dimensional wire mesh obtained in step a), c) placing the hollow and apertured internal skeleton under vacuum and bonding at least one composite sheet made of fiber and resin around the hollow and apertured internal skeleton so as to form an external shell of the rigid aquatic floating object, d) applying successive fiber-and-resin layers so as to reinforce, via stratification, the external shell obtained in step c), and e) finishing an external surface of the external shell reinforced via stratification obtained in step d) by sanding to obtain a final shape of the rigid aquatic floating object, wherein said step c) further comprises of a first sub-step c1) of preparing a first sheet of composite resin constituting the underside of the rigid aquatic floating object, a second sub-step c2) of preparing a second sheet of composite resin constituting the deck of the rigid aquatic floating object, and a third sub-step c3) of joining the first sheet and the second sheet around the hollow and apertured internal skeleton and simultaneous bonding of the first sheet and the second sheet in a vacuum bag.

2. The process according to claim 1, wherein step a) includes two primary sub-steps of individualized digital modeling of the rigid aquatic floating object based on collection of user parameters wherein:

a1) a user answers a questionnaire relating to the user parameters including personal physiological data such as weight and height, rigid aquatic floating object use data, physical fitness and usual surfing conditions, and external data of the rigid aquatic floating object such as the main length, the width, the thickness and general proportions, and a2) use of a first personalization algorithm which selects, from a database of determined boards, a model most suited to the user according to the user parameters previously entered in sub-step a1) in order to carry out the individualized digital modeling of the three-dimensional wire mesh corresponding to the model selected.

3. The process according to claim 2, wherein step a) further includes a secondary sub-step a3) of adaptation of the individualized digital modeling of the model selected in sub-step a2) to modify a total/local density and/or thicknesses of mesh lines of the three-dimensional wire mesh according to the user parameters that the user has previously entered in sub-step a1).

4. The process according to claim 3, wherein step a) includes a tertiary sub-step a4) of cutting the three-dimensional wire mesh into a multitude of parallel slices preparing for 3D printing, said multitude of parallel slices then being produced by superposition during the 3D printing step b).

5. The process according to claim 1, wherein, during sub-step c1), the first sheet is previously produced on a flat work bench then cut at a median external profile of a front board before being bonded.

6. The process according to claim 1, wherein, during sub-step c2), the second sheet is previously produced on the hollow and apertured internal skeleton in order to produce a preform of said rigid aquatic floating object, then the second sheet is bonded on the hollow and apertured internal skeleton after crosslinking the resin.

7. The process according to claim 1, wherein at least one of the at least one composite sheet is produced by molding.

8. The process according to claim 1, wherein step b) comprises of a first sub-step b1) of manufacturing at least two distinct portions of the hollow and apertured internal skeleton and a second sub-step b2) of joining the at least two distinct portions by bonding.

9. The process according to claim 8, wherein the at least two distinct portions are bonded on either side of an intermediate internal transverse rail.

10. The process according to claim 1, wherein step b) comprises of manufacturing an entire internal skeleton of the rigid aquatic floating object integrally.

11. The process according to claim 1, wherein step b) comprises of producing the hollow and apertured internal skeleton including a median peripheral belt and a central cellular structure comprising a plurality of polygonal geometric patterns each having wires, wherein a flat angle between two consecutive wires of a same pattern is substantially equal to 60°.

12. The process according to claim 11, wherein the central cellular structure includes, respectively at the deck and the underside, a repetition of patterns in a shape of a hexagon, each reinforced by wires connecting vertices to a center of said hexagon.

13. The process according to claim 11, wherein the central cellular structure includes, respectively at the deck and the underside, a repetition of patterns in a shape of a triangle.

14. The process according to claim 11, wherein during step b) the central cellular structure constituting the deck and the underside are connected to each other by walls extending substantially perpendicular to the underside, according to the thickness of the hollow and apertured internal skeleton.

15. The process according to claim 14, wherein the central cellular structure is connected by completely solid walls.

16. The process according to claim 14, wherein the central cellular structure is connected by apertured walls.

17. The process according to claim 1, wherein material used for stratification in step c) is transparent or translucent.

18. The process according to claim 17, wherein the material used for stratification in step c) is a composite made of glass, linen, hemp or carbon fibers mixed with an epoxy or polyester resin.

19. The process according to claim 1, wherein the material used in step b) is selected from a set consisting of recycled polyethylene terephthalate, biosourced poly lactic acid, polyethylene terephthalate reinforced with fibers among carbon, kevlar, glass or vegetable fibers, or a combination thereof, expanded poly lactic acid, expanded polyethylene terephthalate or polyamide.

20. The process according to claim 1, wherein a volume of material used in step b) to produce the hollow and apertured internal skeleton is comprised between 1% and 10% of a total volume enclosed by the external shell of the rigid aquatic floating object.

21. The process according to claim 1, wherein the rigid aquatic floating object is a surfboard.

22. A rigid aquatic floating object comprising an elongate three-dimensional external profile having in total a main length extending from nose to tail, a thickness, a width, a deck and an underside, wherein the rigid aquatic floating object is manufactured using the process according to claim 1.

* * * * *